United States Patent [19]

Somezawa et al.

[11] 4,100,326
[45] Jul. 11, 1978

[54] METHOD FOR TREATING A MAGNETIC RECORDING MEDIUM

[75] Inventors: Masashi Somezawa; Shigetaka Higuchi, both of Sendai; Tatsuo Shimizu; Isao Ishibashi, both of Tagajo, all of Japan

[73] Assignee: Sony Corporation, Tokyo, Japan

[21] Appl. No.: 595,086

[22] Filed: Jul. 11, 1975

Related U.S. Application Data

[63] Continuation-in-part of Ser. No. 439,231, Feb. 4, 1974, abandoned.

[30] Foreign Application Priority Data

Feb. 3, 1973 [JP] Japan .................................. 48-13968

[51] Int. Cl.$^2$ .......................................... H01F 10/02
[52] U.S. Cl. .................................. 427/130; 427/128
[58] Field of Search .............................. 427/127–130, 427/131, 132

[56] References Cited

U.S. PATENT DOCUMENTS

| 3,216,846 | 11/1965 | Hendrick et al. | 427/130 UX |
| 3,293,066 | 12/1966 | Haines | 427/128 UX |
| 3,398,011 | 8/1968 | Neirotti et al. | 427/130 UX |

Primary Examiner—Bernard D. Pianalto
Attorney, Agent, or Firm—Lewis H. Eslinger; Alvin Sinderbrand

[57] ABSTRACT

A method of preparing a magnetic recording medium, the surface of which has a very smooth magnetic layer. Magnetic paint is coated on a non-magnetic base, which is then passed between calender rolls which comprise a polyurethane roll and a steel roll heated between approximately 40° C. and 200° C. The hardness of the polyurethane roll is greater than approximately 70° in Shore D, and the pressure between the rolls is between approximately 50 Kg/cm and 500 Kg/cm.

6 Claims, 1 Drawing Figure

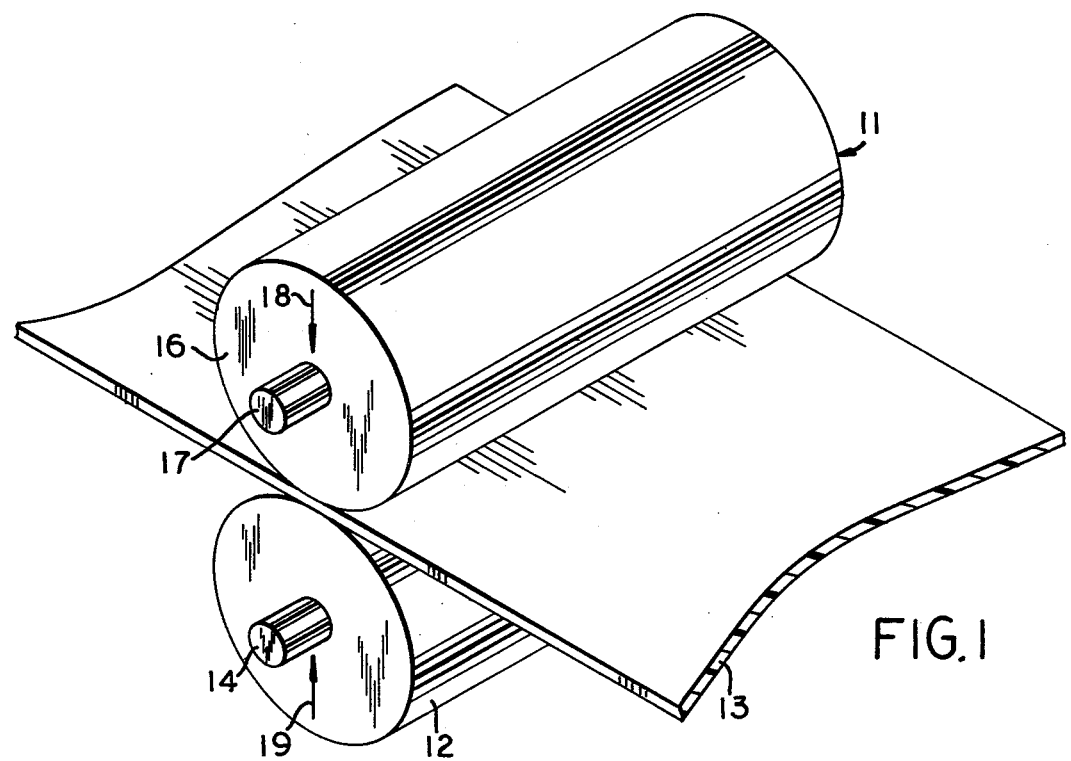

METHOD FOR TREATING A MAGNETIC RECORDING MEDIUM

This application is a continuation-in-part of application Ser. No. 439231, filed Feb. 4, 1974 and now abandoned.

BACKGROUND OF THE INVENTION
1. Field of the Invention

This invention relates to a process for the manufacture of magnetic recording media, especially to the surface treatment of magnetic recording tape.
2. Description of the Prior Art When a magnetic recording tape of the conventional type generally constituted by a flexible base of non-magnetic material supporting a magnetic layer containing finely-divided magnetic particles dispersed in a flexible binder is to be used in video recording, it must be capable of recording information at high density. This depends on the coercive force ($H_c$), the residual magnetic flux density ($B_r$), the rectangular ratio ($R_s = B_r/B_m$ in which $B_m$ is the retentivity), and the smoothness of the surface of the magnetic layer to be able to record at high density.

When magnetic tape is driven relative to a magnetic head, the magnetic layer contacts the head very closely. However, there are many irregularities on the magnetic layer, so that the magnetic head contacts only the convex parts of the irregularities. As a result, such irregularities lead to attenuation of the output signal (so-called spacing loss) and to the generation of noise.

Surface treatment, such as calendering the magnetic layer containing the finely-divided magnetic particles dispersed in the flexible binder to improve a surface state and the density of magnetic particles in the manufacturing process is known. This calendering process is performed by passing the magnetic tape between a rotatory steel roll and an elastic roll, which generally are in contact with the magnetic layer and the support base, respectively, at the proper temperature and pressure. If there are irregularities on the surface of such rolls, they cause an unevenness to be transferred to the surface of the magnetic tape, and this reduces the benefit of the surface treatment. Therefore, the rolls which are used in such calendering process are required to have no irregularities of hardness and to have high durability and heat resistance. Irregularities of hardness cause a lack of uniformity of pressure, so that the rolls cannot be used in manufacturing at high temperature.

The steel roll presents no problem because it can easily be made smooth by polishing, and its surface has high hardness and durability. On the other hand, in prior art cotton rolls, woolen rolls which comprise cotton, absorbent cotton, pulp or wool and used as the elastic roll results in a gathering or fiber, so there is a limit to the smoothness of the surface of such rolls. If the irregularity of hardness on the surface of the elastic roll exists, such irregularity transfers to the surface of the magnetic tape and has a bad influence on the signal-to-noise ratio.

Moreover, it is required that the hardness of the elastic roll be high to increase the density of magnetic particles in the magnetic layer. This relation is as follows:

$$h_o^2 = \frac{3}{2} \cdot \frac{WD}{\pi E} \text{ in which } \frac{1}{D} = \frac{1}{D_1} + \frac{1}{D_2}$$

where:
- $2h_o$ is the nip width, or width of the contact surface between the elastic roll and steel roll;
- $W$ is the applied pressure per unit length of the rolls;
- $E$ is Young's modulus of the elastic material; and
- $D_1$ and $D_2$ are the diameters of the rolls.

Because Young's modulus of the elastic material is low, i.e., the hardness is low, the nip width $2h$ becomes large, which causes the pressure per unit area of the magnetic tape to be low. This causes the density of the particles not to increase.

Heretofore, it has been thought to be impossible to smooth out irregularities on the magnetic layer of the magnetic tape by a dry-calendering process. Thus, the addition of lubricants to the tape surface and/or to the calendering rolls was believed to be necessary to attain a successfully smoothed surface. One such technique for injecting a lubricant into the tape coating during calendering is described in U.S. Pat. No. 3,398,011. Contrary to the assumptions of the prior art, this invention is directed to a successful dry-calendering process for smoothing irregularities in the surface of a magnetic tape.

SUMMARY OF THE INVENTION

It is one object of this invention to provide an improved dry-calendering process for the manufacture of magnetic recording media.

It is another object to provide an improved surface treatment process of magnetic recording tape without the use of an added lubricant.

It is a further object of this invention to provide a surface treatment process which uses a polyurethane roll and a steel roll.

It is a further object of this invention to provide a method to manufacture magnetic tape with a very smooth surface and a high density of magnetic particles in the magnetic layer.

DESCRIPTION OF THE PREFERRED EMBODIMENTS

The only drawing in this case shows a pair of calender rolls 11 and 12 with a section of magnetic recording medium, such as magnetic tape, 13 passing between them, whereby the roll 12 is in contact with the magnetic layer of the tape and the roll 11 is in contact with the support base of the tape, as is known. The tape may be of the aforementioned type constituted by a flexible base of non-magnetic material supporting the magnetic layer containing finely-divided magnetic particles dispersed in a flexible binder. This drawing is only for illustrative purposes, and does not indicate the actual relative sizes of the elements. The roll 12 is a steel roll having a stub axle 14 connected to means to rotate the roll. The roll 11 has an outer layer 16 of polyurethane around a shaft 17 of iron or steel. Suitable means, which are standard in the industry, apply pressure in the directions indicated by the arrows 18 and 19 to force the surfaces of the rolls 11 and 12 against opposite surfaces of the material 13 to be calendered. As is indicated, no lubricant is added to the tape.

One of the parameters that is important in producing a successful polyurethane roll is the surface hardness. In the following example, polyurethane rolls of varying hardness were tested.

EXAMPLE I

In each of the tests, a roll of polyurethane was formed by winding a thickness of 10mm of polyurethane on an iron core of 290mm diameter. The polyurethane in the different rolls had Shore hardnesses of 60°, 65°, 70°, 75°, and 85°. In each case, the surface of the roll is polished. Magnetic tape for video recording was passed between each of the polyurethane rolls (in contact with the support base) and a steel roll (in contact with the magnetic layer), and the polyurethane was kept at a temperture of 60° C. with a pressure of 250Kg/cm being applied to the tape by the opposing forces on the steel roll and the polyurethane roll. The tape was run through the rolls at a speed of 60m/min.

For comparison, a roll having cotton on the outside instead of polyurethane was also used in calendering similar magnetic tape. A comparison of electronic tests formed on the calender tape is listed in Table 1 in which:

TABLE 1

|  | Using Cotton Roll (Prior Art) | Using Polyurethane Roll Shore D Hardness | | | | |
|---|---|---|---|---|---|---|
|  |  | 85° | 75° | 70° | 65° | 60° |
| Residual Magnetic Flux Density (Gauss) | 1030 | 1050 | 890 | 830 | 780 | 750 |
| RF-S (db) | 0 | +1.4 | +0.2 | −2.1 | −3.5 | −3.8 |
| S/N (db) | 0 | +1.2 | +0.4 | −0.4 | −1.9 | −1.9 |
| C (db) | 0 | +0.8 | 0 | −0.5 | −1.0 | −1.0 |
| C/N (db) | 0 | −3.3 | −2.1 | +1.5 | +0.5 | +0.3 |
| Surface Roughness ($\mu$) | 0.120 | 0.05 | 0.06 | 0.06 | 0.09 | 0.10 |

The values indicated in Table 1 are obtained by making the following measurements:

RF-S is the reproduced output signal of the luminance signal of 4.6MHz,

S/N is the signal-to-noise ratio of the luminance signal of 4.6MHz,

C is the reproduced output signal of the color signal of 750KHz,

C/N is the signal-to-noise ratio of the color signal of 750KHz,

Surface Roughness was measured using the multi-interference method.

The results of tests performed on the magnetic tapes calendered by the cotton roll and the polyurethane rolls in this Example indicate that the polyurethane rolls produced a better signal-to-noise ratio of the color signal than did the cotton roll. This was because the surface roughness of the tape calendered by the polyurethane rolls was half the value of the roughness produced by calendering the tape with a cotton roll.

The tests further indicate that, for polyurethane rolls having a hardness of over 75° measured in Shore D, the luminance signal had a high value. These tapes also had good signal-to-noise ratio for the luminance signal and for the color signal. The tape calendered by the polyurethane roll having a hardness of 85° measured in Shore D exhibited extremely high quality.

Further tests were performed to determine the relationship of temperature and pressure of the rolls to the quality of the tape produced. In these tests, it was found as the temperature increased, the magnetic layer became fluid, so that the surface treatment effect increased with the same pressure. However, when the temperature exceeds 200° C., the base material of the tape 13 may change its shape or the magnetic layer may become so soft that it adheres to the steel roll 12. If the temperature of the polyurethane roll 11 is in excess of 100° C., the polyurethane 16 becomes soft. However, since there is magnetic tape 13 between the rolls 11 and 12, the temperature of the polyurethane 16 can be kept under 100° C. if the temperature of the steel roll 12 is kept at 200° C. The temperature of the polyurethane can be kept from rising by blowing cool air across its surface to hold it below 100° C.

When the temperature is less than about 40° C., the desired surface treatment of the tape 13 cannot be obtained.

With respect to pressure applied in the direction of the arrows 18 and 19, the density of the magnetic particles increases as the pressure increases. Therefore, high pressure is preferable up to a maximum of about 450 Kg/cm to 500 Kg/cm. Increasing the pressure beyond 500 Kg/cm does not improve the density of the magnetic particles. In fact, if the pressure is in excess of about 500 Kg/cm it is detrimental to the polyurethane roll 11 and tends to cause breakage of the polyurethane 16 after only a few hours of operation.

At the low end of the scale, it has been found that magnetic tape cannot be satisfactorily calendered if the pressure is less than approximately 50 Kg/cm. The preferable range of pressure is from approximately 150 Kg/cm to 300 Kg/cm.

In making the polyurethane for this invention, epoxy resin, polyphenylene sulfide resin, or polycarbonate can be used as the polyurethane resin. Various materials can be added to the polyurethane, such as armature, filler, an electrification-resistant agent, and an absorption agent of ultraviolet rays. The latter agent may be, for example, carbon or silica gel.

What is claimed is:

1. A dry-calendering method of treating a magnetic tape formed of a flexible base of non-magnetic material supporting a magnetic layer containing finely-divided magnetic particles dispersed in a flexible binder to have low surface roughness and a high density of magnetic particles comprising the steps of passing said tape, in the absence of an introduced lubricant, between a metal roll and an elastic roll having a polyurethane cylindrical surface with a hardness of no less than approximately 70° measured in Shore D, the temperature of said metal roll being in the range of approximately 40° C. to approximately 200° C. at the cylindrical surface thereof, and the pressure between said rolls being in the range from approximately 50 Kg/cm to approximately 500 Kg/cm, the metal roll contacting said magnetic layer and the elastic roll contacting said flexible base.

2. The method of claim 1 in which the hardness of said cylindrical surface of said polyurethane is between approximately 70° and 85° measured in Shore D.

3. The method of claim 2 in which the cylindrical surface of said polyurethane roll has a hardness of approximately 85° measured in Shore D.

4. The method of claim 1 in which the temperature of the cylindrical surface of said polyurethane is less than approximately 100° C.

5. The method of claim 4 comprising, in addition, blowing cooling air across the cylindrical surface of said polyurethane to maintain the temperature of said cylindrical surface less than approximately 100° C.

6. The method of claim 1 in which the pressure between said rolls is in the range between approximately 150 Kg/cm and 300 Kg/cm.

* * * * *